May 26, 1925.
C. C. FARMER
1,538,932
TRAIN CONTROL DEVICE
Filed June 24, 1924
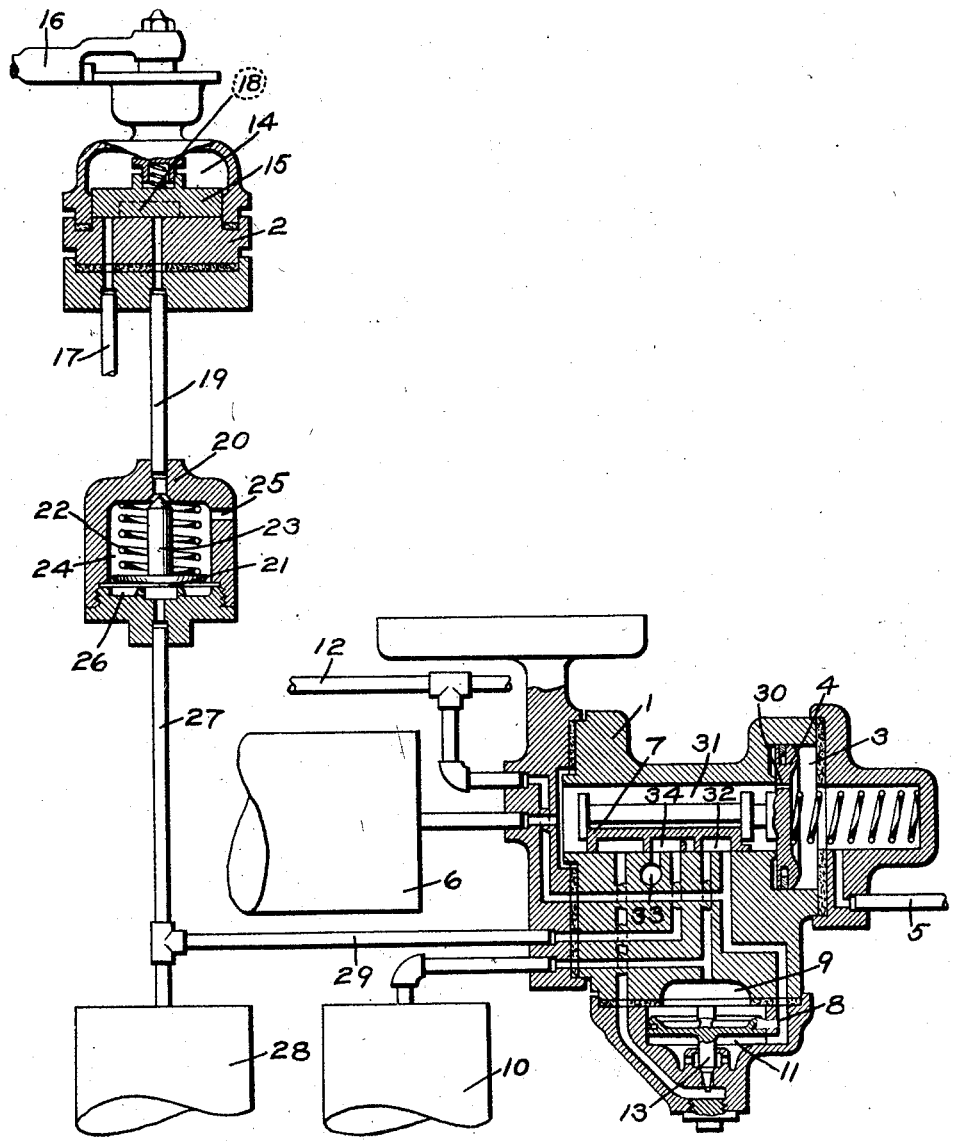
INVENTOR
CLYDE C. FARMER
BY *Wm. M. Cady*
ATTORNEY Patented May 26, 1925.

1,538,932

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

TRAIN-CONTROL DEVICE.

Application filed June 24, 1924. Serial No. 722,015.

*To all whom it may concern:*

Be it known that I, CLYDE C. FARMER, a citizen of the United States, residing at Pittsburgh, in the county of Allegheny and State of Pennsylvania, have invented new and useful Improvements in Train-Control Devices, of which the following is a specification.

This invention relates to automatic train control equipment and has for its principal object to provide means for preventing the release of the brakes by the engineer on the locomotive when the train control apparatus is in action.

In the accompanying drawing, the single figure is a diagrammatic view, partly in section, of a portion of a train control equipment showing my invention associated therewith.

The apparatus shown in the drawing comprises a train control application valve device 1 and a brake valve device 2. The brake valve shown is known as the independent brake valve as used in connection with the well known E T locomotive brake equipment, although it should be understood that my invention may also be applied in connection with other brake valves such as an ordinary straight air brake valve device.

The application valve device 1 may comprise a casing having a piston chamber 3 containing a piston 4, said chamber being connected to a pipe 5, the venting of fluid from which by the operation of the train control apparatus (not shown) operates to effect the movement of said piston to application position.

The casing also has a valve chamber 31 connected to a reservoir 6 and containing a slide valve 7 adapted to be operated by piston 4.

Associated in the casing of the application valve device is a brake pipe equalizing discharge valve device comprising a piston 8 having chamber 9 at one side connected to an equalizing reservoir 10 and the chamber 11 at the opposite side connected to the usual brake pipe 12. The piston 8 carries a discharge valve 13 for venting fluid from the brake pipe 12 to effect an application of the brakes.

The brake valve device 2, as shown in the drawing, may comprise a casing having a rotary valve chamber 14 containing a rotary valve 15 adapted to be operated by a handle 16.

Leading to the seat of the rotary valve 15 is a pipe and passage 17 through which fluid under pressure is vented from the application chamber of the distributing valve device of the E T equipment to effect the release of fluid from the locomotive brake cylinders, or through which fluid may be vented directly from the brake cylinders.

When the rotary valve 15 of the brake valve device 2 is turned by handle 16 to release position, a cavity 18 therein connects pipe 17 with an atmospheric exhaust pipe 19. Connected to the exhaust pipe 19 is a valve device comprising a casing 20 containing a flexible diaphragm 21 subject on one side to the pressure of a spring 22 and carrying a valve 23 adapted to control communication from the exhaust pipe 19 to chamber 24 at one side of diaphragm 21, said chamber having an atmospheric exhaust port 25.

The chamber 26 at the opposite side of diaphragm 21 is connected by pipe 27 to a reduction limiting reservoir 28, which reservoir is also connected by pipe and passage 29 to the seat of slide valve 7.

In operation, the piston chamber 3 is normally charged with fluid under pressure supplied through pipe 5 and fluid flows through an equalizing port 30 in piston 4 to valve chamber 31, charging the reservoir 6. The equalizing reservoir 10 is charged from the brake pipe 12 by way of cavity 32 in slide valve 7 when said slide valve is in release position, as shown in the drawing, and the reduction limiting reservoir 28 is connected to exhaust port 33 through cavity 34 in slide valve 7.

The chamber 26 at one side of diaphragm 21 is therefore normally at atmospheric pressure, permitting the spring 22 to hold the diaphragm 21 and valve 23 in open position, so that the engineer may under the above conditions manipulate the brake valve device 2 for effecting the independent release of the brakes on the locomotive by turning the rotary valve 15 to the position in which cavity 18 connects pipe 17 with exhaust pipe 19. In this position, fluid is vented from pipe 17 to pipe 19 and thence past the open valve 23 to chamber 24 and exhaust port 25.

When the train control apparatus operates, fluid is vented from pipe 5 and piston chamber 3, so that piston 4 is shifted to application position by the fluid pressure in valve chamber 31 and in this position, the equalizing reservoir 10 and chamber 9 at one side of piston 8 are connected through cavity 34 in slide valve 7 with the reduction limiting reservoir 10. The pressure in the equalizing reservoir then equalizes into the reservoir 28 and the reduction in pressure in chamber 9 causes the brake pipe pressure acting in chamber 11 to effect the upward movement of the piston 8 and the opening of the discharge valve 13. Fluid is then vented from the brake pipe 12 to effect an application of the brakes in the usual manner.

The increase in fluid pressure in the reduction limiting reservoir 28 acts in chamber 26 on the diaphragm 21 and operates said diaphragm to close the valve 23. It will now be evident, that if the engineer moves the brake valve handle to release position, the brakes on the locomotive will not be released, since the atmospheric outlet of the exhaust pipe 19 is cut off by the closing of valve 23.

When the application piston 4 is returned to release position, the reduction limiting reservoir 28 is again connected to the exhaust port 33, so that fluid under pressure in said reservoir is vented to the atmosphere, and the diaphragm 21 is then moved by spring 22 to again open the valve 23, permitting the normal operation of the brake valve device 2 to effect the independent release of the locomotive brakes.

Having now described my invention, what I claim as new and desire to secure by Letters Patent, is:—

1. The combination with a brake application valve device and a brake valve device for controlling the release of the brakes, of means controlled by said application valve device for controlling communication through which the release of the brakes is effected by manipulation of said brake valve device.

2. In a train control equipment, the combination with an application valve device for effecting an application of the brakes and a brake valve device operable by the engineer for effecting the release of the brakes, of means operative when said application valve device is acting to effect an application of the brakes for preventing the release of the brakes by operation of the brake valve device.

3. The combination with an application valve device for effecting an application of the brakes and a brake valve device for controlling the release of the brakes, of a reservoir normally at atmospheric pressure, means operating upon movement of said application valve device to application position for charging said reservoir with fluid under pressure, and means operated by fluid under pressure in said reservoir for cutting off communication through which the brakes are released by operation of said brake valve device.

4. The combination with a brake pipe, an equalizing reservoir, a reduction limiting reservoir, and valve mechanism operated upon venting fluid from the equalizing reservoir to the reduction limiting reservoir for venting fluid from the brake pipe, of a brake valve device having a pipe through which fluid is released to effect the release of the brakes, and means operated by fluid pressure in said reduction limiting reservoir for closing communication for releasing fluid through said pipe.

5. The combination with a brake pipe, an equalizing reservoir, a reduction limiting reservoir, and valve mechanism operated upon venting fluid from the equalizing reservoir to the reduction limiting reservoir for venting fluid from the brake pipe, of a brake valve device having a pipe through which fluid is released to effect the release of the brakes, a valve for controlling the exhaust outlet from said pipe, and a movable abutment subject to the pressure in said reduction limiting reservoir for controlling said valve.

6. The combination with an independent brake valve device for controlling the release of the brakes on the locomotive, of an application valve device for effecting an application of the brakes, and means controlled by said application valve device for preventing the release of the brakes on the locomotive by the operation of said brake valve device.

7. The combination with an independent brake valve device for controlling the release of the brakes on the locomotive, of an application valve device for effecting an application of the brakes, and means for preventing the release of the brakes on the locomotive by operation of said brake valve device upon operation of said application valve device to effect an application of the brakes.

In testimony whereof I have hereunto set my hand.

CLYDE C. FARMER.